United States Patent
Doudement et al.

Patent Number: 5,116,217
Date of Patent: May 26, 1992

[54] APPARATUS FOR MANUFACTURING HOLLOW PLASTIC BOTTLES FROM PREFORMS, WITH MEANS FOR SWINGING THE PREFORMS

[75] Inventors: Gerard Doudement; Alain Evrard, both of Le Havre, France

[73] Assignee: Sidel, Cedex, France

[21] Appl. No.: 518,586

[22] Filed: May 2, 1990

[30] Foreign Application Priority Data

May 3, 1989 [FR] France ............... 89 05885

[51] Int. Cl.$^5$ ............................. B29C 49/42
[52] U.S. Cl. ................... 425/534; 198/408; 198/578
[58] Field of Search ......... 425/534, 540; 198/408, 198/578

[56] References Cited

U.S. PATENT DOCUMENTS

| | | | |
|---|---|---|---|
| 1,981,642 | 11/1934 | Benoit | 198/408 |
| 3,947,180 | 3/1976 | Neumaier | 425/534 X |
| 4,069,002 | 1/1978 | Seelye | 425/540 X |
| 4,355,968 | 10/1982 | Lagoutte et al. | 425/526 |

FOREIGN PATENT DOCUMENTS

4734823  9/1972  Japan ............................. 425/540
2074496  11/1981  United Kingdom.

*Primary Examiner*—Richard L. Chiesa
*Attorney, Agent, or Firm*—Sughrue, Mion, Zinn, Macpeak & Seas

[57] ABSTRACT

Equipment for the manufacture of hollow plastic bottles from preforms (16) having a closed end and an open end forming a neck, includes a conveyor equipped with supports (11) for the preforms which are driven in a predetermined path (T). The supports are arranged one after the other and are capable of pivoting over a given angular range when acted upon by a cam guide and follower arrangement (17, 18) such that the preforms may be inverted from their initial position. The cam guide may be an elongated, stationary rod (17) in the shape of a spiral section coiled around the path (T) followed by the swivel pins (13) of the supports, having a length determined according to the pitch of the spiral and to the angular swing amplitude required for the preforms. Follower rollers (18) are mounted on each support and flank the rod (17) such that, during the displacement of the supports along their path, the supports and preforms carried thereby are swung through 180°.

5 Claims, 6 Drawing Sheets

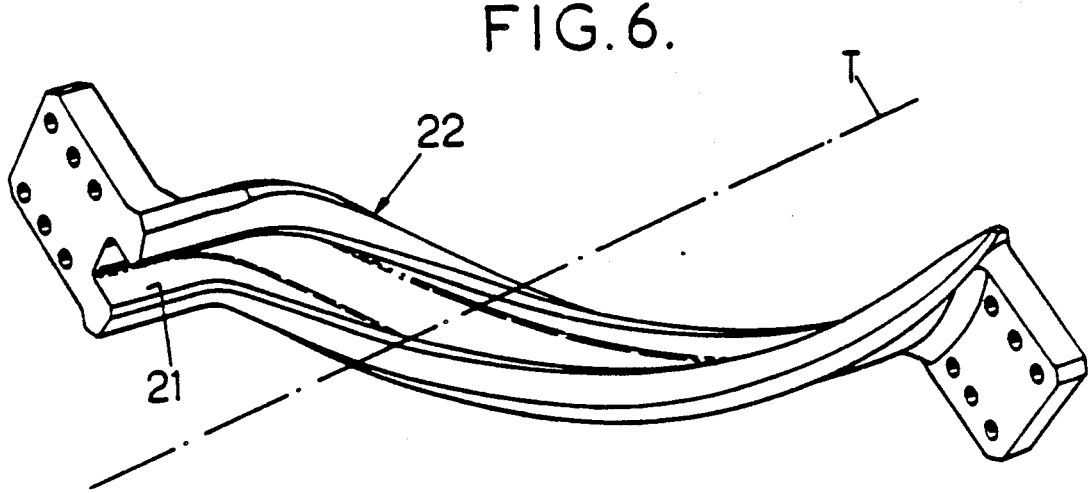

APPARATUS FOR MANUFACTURING HOLLOW PLASTIC BOTTLES FROM PREFORMS, WITH MEANS FOR SWINGING THE PREFORMS

BACKGROUND OF THE INVENTION

This invention concerns improvements made to equipment for manufacturing hollow plastic bottles or the like from preforms, equipped with means for swinging the preforms.

In conventional machines for the manufacture of such hollow objects by blowing or stretching-blowing, at least the following components are provided: a thermal processing station in which the preforms are heated to a temperature such that they may be molded by blowing or stretching/blowing; a preform blowing station having molds shaped like the hollow parts to be produced; and conveyors which bring the preforms to the thermal processing station and transfer them to the blowing station.

In a machine of this type, the preforms are conveyed to the thermal processing station in the vertical position, the open neck or mouth of the preforms being turned upward. The heating of the preform in the neck-up position does not lead to satisfactory thermal processing, however. Indeed, since heat has a tendency to rise, the neck positioned on top is also heated, and therefore tends to become deformed and to lose the final configuration imparted to it during the manufacture of the preform.

The conventional solution to this problem consists in heating the preform with the neck on the bottom, in order to avoid the above-mentioned deformation of the neck. It is necessary, therefore, to provide a reversing device which makes it possible to move the preform from the neck-up to the neck-down position before heating, then to bring it back to the neck-up position for the rest of the process for the manufacture of a completed hollow bottle.

One example of a known reversing device is described and illustrated in FIGS. 4 and 5 of French Patent No. 2,479,077. Each preform is held by a support mounted to pivot by means of a pin on a frame. The reversal of the preform support is accomplished by a toothed sector driven by a cam, which meshes with a toothed pinion which rotates as one piece with the pin of the support.

This device, although working satisfactorily, is difficult to adjust (in particular to establish parallelism of the teeth of the toothed sector and of the pinion) and burdensome to manufacture. In addition, the machine has a relatively complex structure.

SUMMARY OF THE INVENTION

A principal purpose of the invention consists, therefore, in overcoming the disadvantages of previous devices and in proposing a technological solution which better meets various practical requirements, and which, in particular, consists in a relatively simple mechanical structural arrangement having a minimum of moving parts, requiring only minimal maintenance during operation and for which construction and operation entail reduced cost.

For these purposes, the equipment according to the invention is characterized basically by the fact that, to effect the reversal of the preforms, a control means comprise:

a stationary, elongated guide piece forming a cam in the shape of a spiral section coiled around the path followed by the swivel or pivot pin of the preform supports, this spiral section having a length determined according to the pitch of the spiral and of the angled amplitude of swing required for the preforms; and follower means attached to each support, which are capable of working in a sliding arrangement in conjunction with the cam piece in such a way that, during the movement of the supports along their path, the follower means guided by the cam piece cause each support to swing.

The arrangement in accordance with the invention is particularly advantageous to the extent that the number of component parts is reduced and that few of them are moving parts. Furthermore, by fitting the follower means with loose rollers supported by the cam piece, it is possible to considerably reduce friction.

A structure of this kind can, furthermore, be easily adapted to the various configurations of the conveyors used in this kind of machine. Indeed, in one example of the invention, the conveyor may be of the linear motion type and the spiral section formed by the cam piece is then coiled around a revolving cylinder whose axis is the path of the swivel pins of the supports. In another embodiment, the conveyor may be of the rotating plate type, and the spiral section formed by the cam piece is then coiled around a toroid whose axis is the path of the swivel pins of the supports.

Furthermore, the production of the cam piece may itself give rise to various embodiments and, therefore, facilitate the installation of the device in a given machine, and/or make possible its optimal adaptation to specific conditions. In one embodiment the cam piece is female and comprises a helicoidal groove; the follower means comprise at least one projecting finger attached to the support and engaged so as to slide in this groove. In another embodiment, which is preferred because of the simplicity of its fabrication and installation, the cam piece is male and comprises a helicoidal filiform guide or similar part, and the follower means incorporates at least two fingers unitary with each support and engaged on opposite sides of the filiform guide in a flanking manner.

As already indicated, each finger is equipped with a free running roller which provides for a rolling contact without slippage with the cam piece, thereby making it possible to reduce friction and wear to the maximum extent possible.

In a preferred arrangement of the invention and in which the complete reversal of the preform is desired, the cam piece extends over approximately one half-turn of the helicoidal winding, so that each preform support pivots by approximately 180° in such a way that the preform moves from a vertical incoming position with the neck turned upward or downward, respectively, to a vertical exiting position with the neck turned downward or upward, respectively. Of course, in the event that the equipment comprises a preform processing station in which the preforms must be positioned neck downward when "downstream" from said station, and neck upward when "upstream" from it, two reversing devices are installed "downstream" and "upstream", respectively, from said station. In such a case, the cam pieces belonging to the two reversing devices located "downstream" and "upstream" from the station advantageously have inverse coiling pitches, so that the preform supports describe the same arc-shaped path in inverse directions, this path being located especially on the side opposite to the conveyor on which the pivoting supports are mounted.

In addition to the above-mentioned advantages obtained by the arrangement in accordance with the invention, it will be noted that it is also possible to easily undertake its installation in existing equipment in place of a pre-existing reversing device, which may, for example, be of the toothed sector type mentioned above.

BRIEF DESCRIPTION OF THE DRAWINGS

FIG. 6 is a perspective view of another embodiment of a component of the equipment in accordance with the invention.

DETAILED DESCRIPTION OF THE PREFERRED EMBODIMENTS

Figure 1:
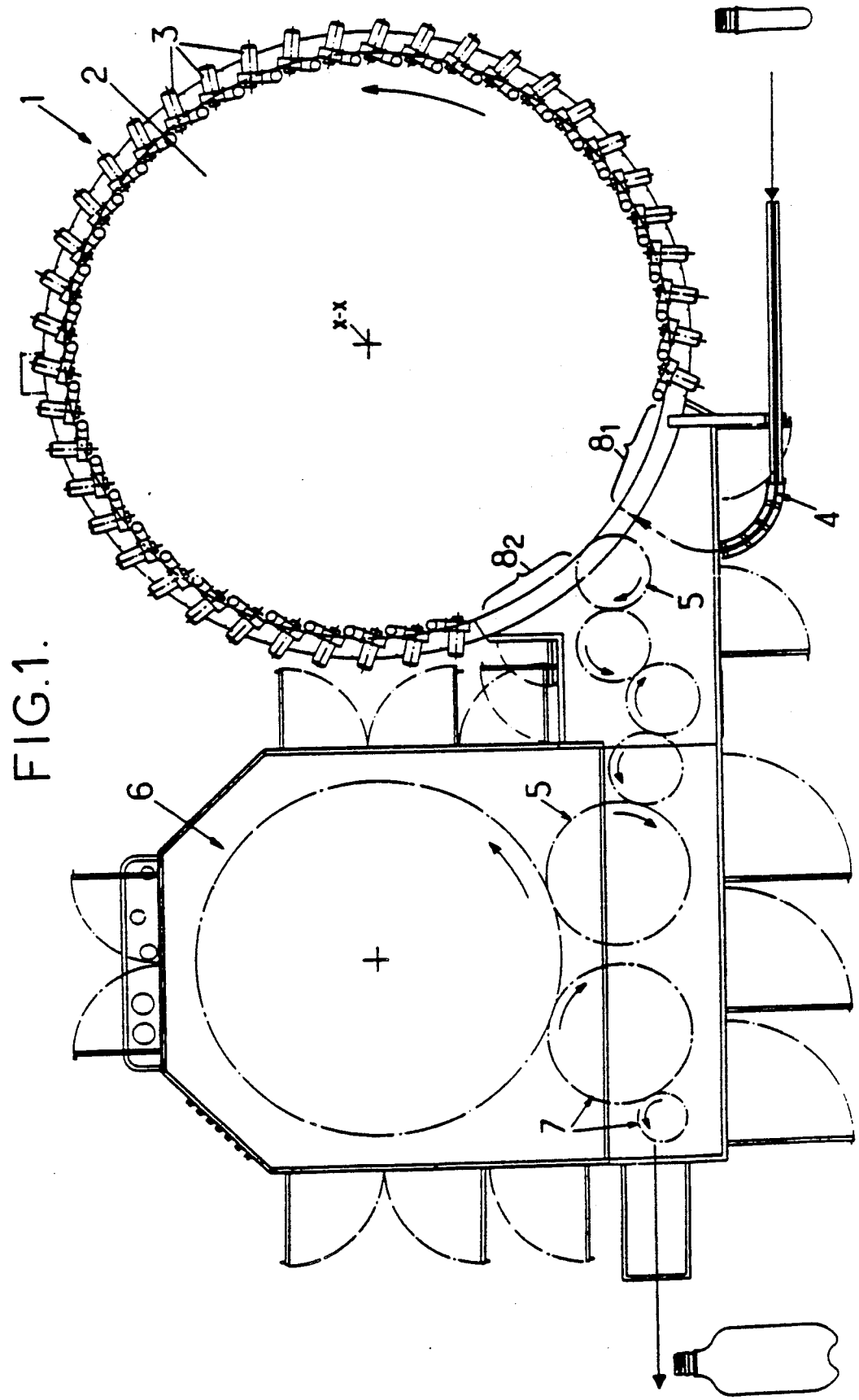
FIGS. 1 and 2 are bird's-eye or plan view diagrams illustrating two types of equipment installations covered by the invention.

FIG. 1 shows diagrammatically one installation specified by the invention and incorporating a circular thermal processing station.

The thermal processing station 1 comprises a horizontal plate 2 which turns around a vertical axis X—X. Preform supports (not shown in FIG. 1), discussed in detail below, are arranged around the periphery of the plate. These supports are mounted so as to be able to pivot over approximately 180°. Stationary ovens 3, for example infrared radiation ovens, are installed on the outside of the plate. They are intended for the thermal treatment of the preforms carried by the plate.

Upstream from the thermal processing station, a feed device 4 brings the preforms to the plate where they are positioned on their respective supports.

Downstream from the thermal processing station, a transfer device 5 takes the heated preforms and conveys them to a blowing station 6, which is also arranged as a rotating unit comprising a multiplicity of molds, in each of which the blowing or stretching/blowing process takes place, making it possible to form a bottle from a preform. At the exit of the blowing station 6, another transfer device 7 grabs the bottles and removes them from the installation.

Upstream and downstream from the thermal processing station 1, the preforms are positioned neck upward; within the thermal treatment stations the preforms are positioned neck downward. Both before and after the ovens, reversing devices, $8_1$ and $8_2$ respectively, arrange the preforms in the required position by a simple 180° rotation of their respective supports.

Figure 2:
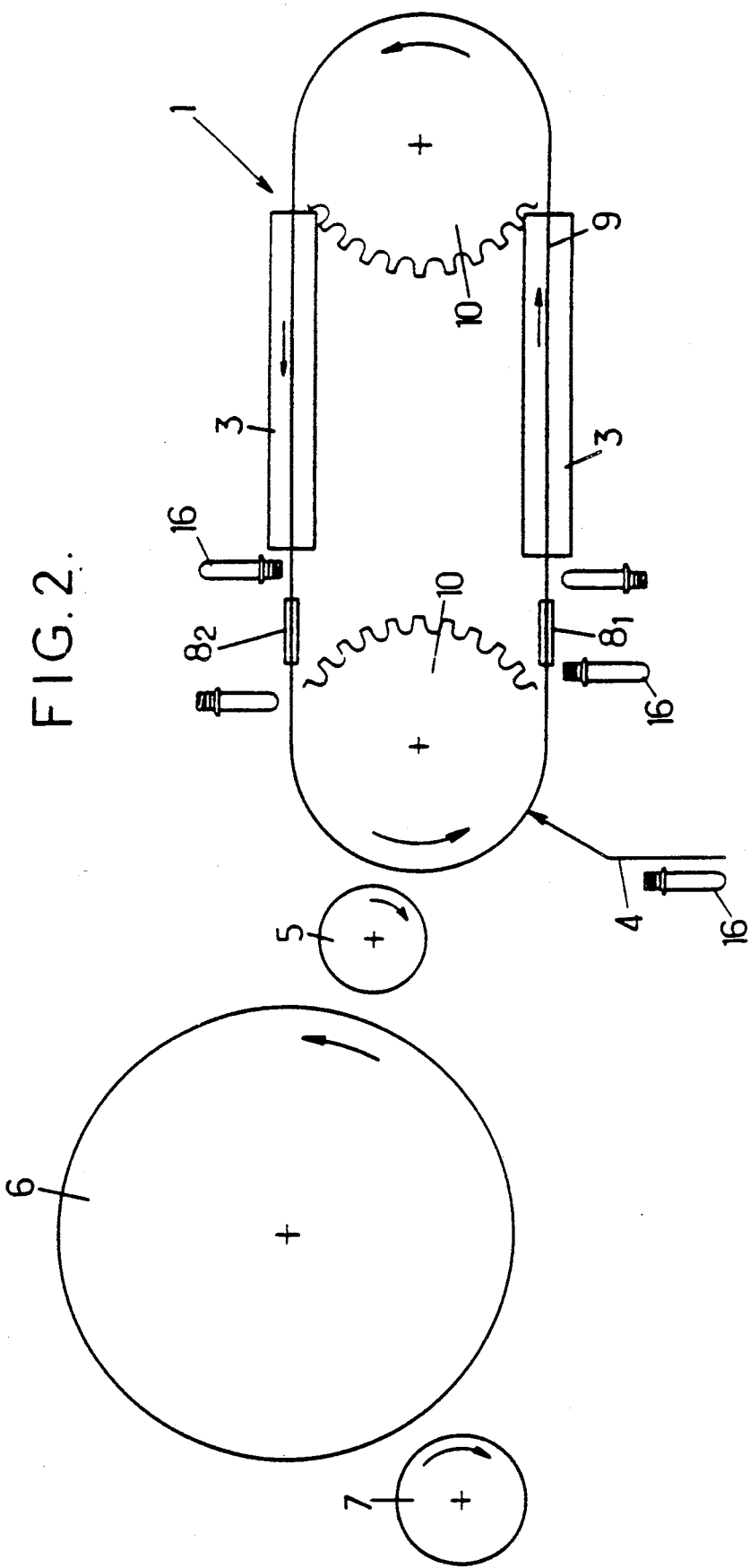

FIG. 2 represents diagrammatically another embodiment of the installation specified by the invention, in which the thermal processing station is of the linear type. In FIG. 2, the same reference numerals have been used to designate the parts identical to those shown in FIG. 1. The thermal processing station comprises an endless conveyor 9 supported by two end wheels 10 (of which one is a driving wheel). The conveyor 9 is equipped with pivoting preform supports. The ovens 3 are spaced along the straight-run sections of the conveyor, and the preforms 16 make a virtually complete trip around it, their entrance and exit occurring in proximity to the wheel 10 located on the left side of the drawing. The preform reversing devices $8_1$ and $8_2$ are installed between the left wheel 10 and the ovens. This installation is otherwise identical to that in FIG. 1.

Figure 3:
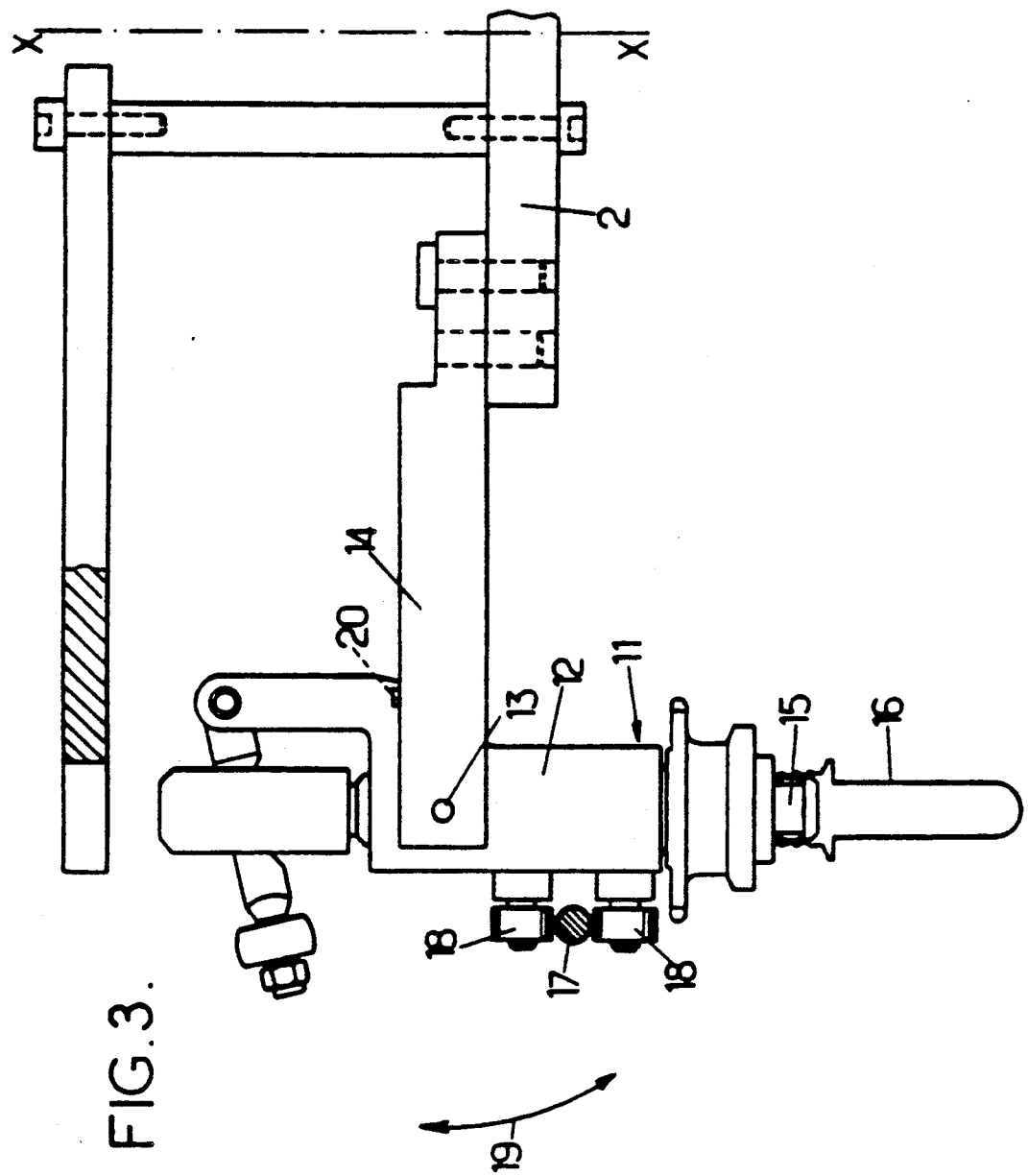
FIGS. 3 and 4 are elevation views illustrating, in two different functional positions, a preform support matching the arrangements specified in the invention.
Figure 4:
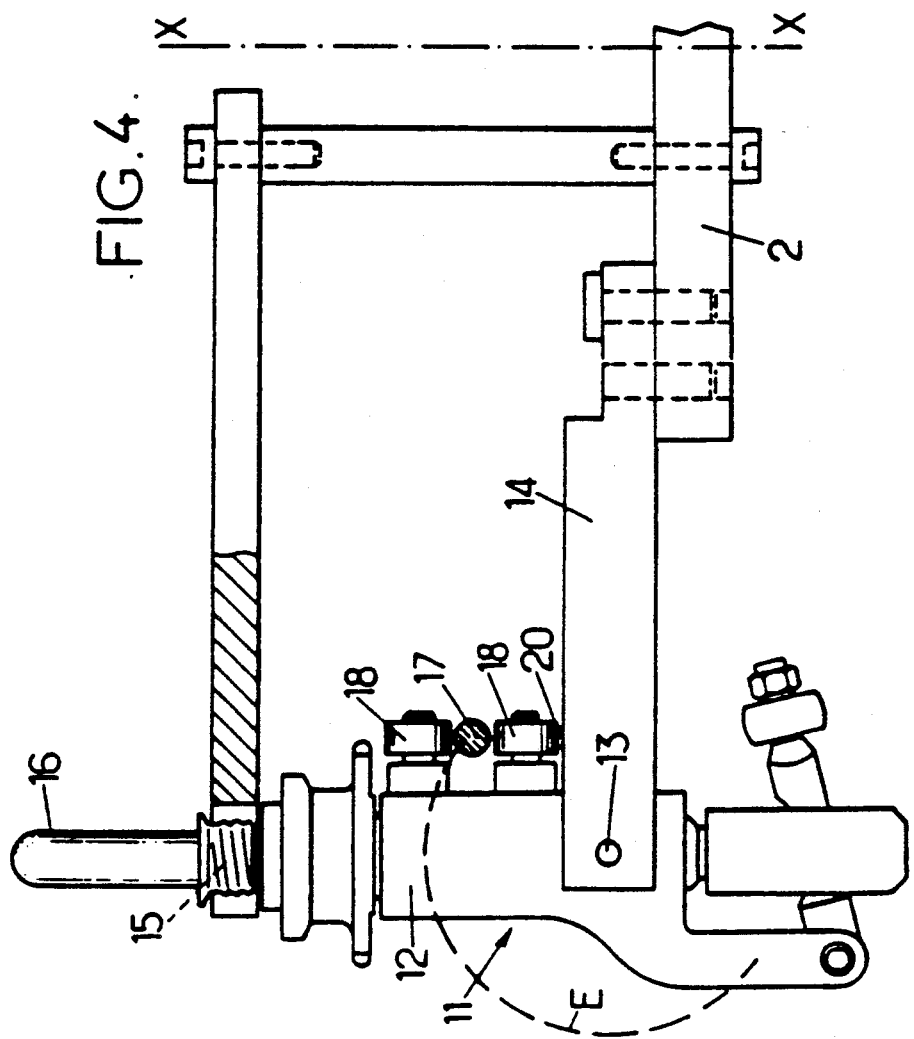

FIGS. 3 and 4, to which, in particular, reference will now be made, show the layout of a preform support. This support, designated by reference numeral 11, comprises a body 12, for example an elongated body, which pivots about a horizontal pin 13 on an arm or clamp 14, itself unitary with the moving apparatus (the plate 2 shown in the installation in FIG. 2 is presumed to exist in FIGS. 3 and 4; or else the endless conveyor 9 illustrated in FIG. 2). At one end the body 12 is equipped with a joining piece 15 designed so that the preform neck fits into it. In the example shown, the preform is vertical. The body 12 may, in addition, be fitted with various equipment useful for the bottle fabrication process, but which, since it does not pertain directly to the invention, will not be described here. Of course, a large number of variants or other embodiments of the supports are possible.

To provoke the swinging motion of the support 11 and to switch the preform from the neck-up (FIG. 3) to the neck-down (FIG. 4) position, each support is equipped with support means capable of sliding during the displacement of the support driven by the movable component (plate or endless conveyor) so as to work in conjunction with an elongated guide piece forming a cam, which extends along the path followed by the supports, the cam piece being shaped like a spiral section coiled about the path taken by the swivel pins 13 of the supports 11.

Figure 5:
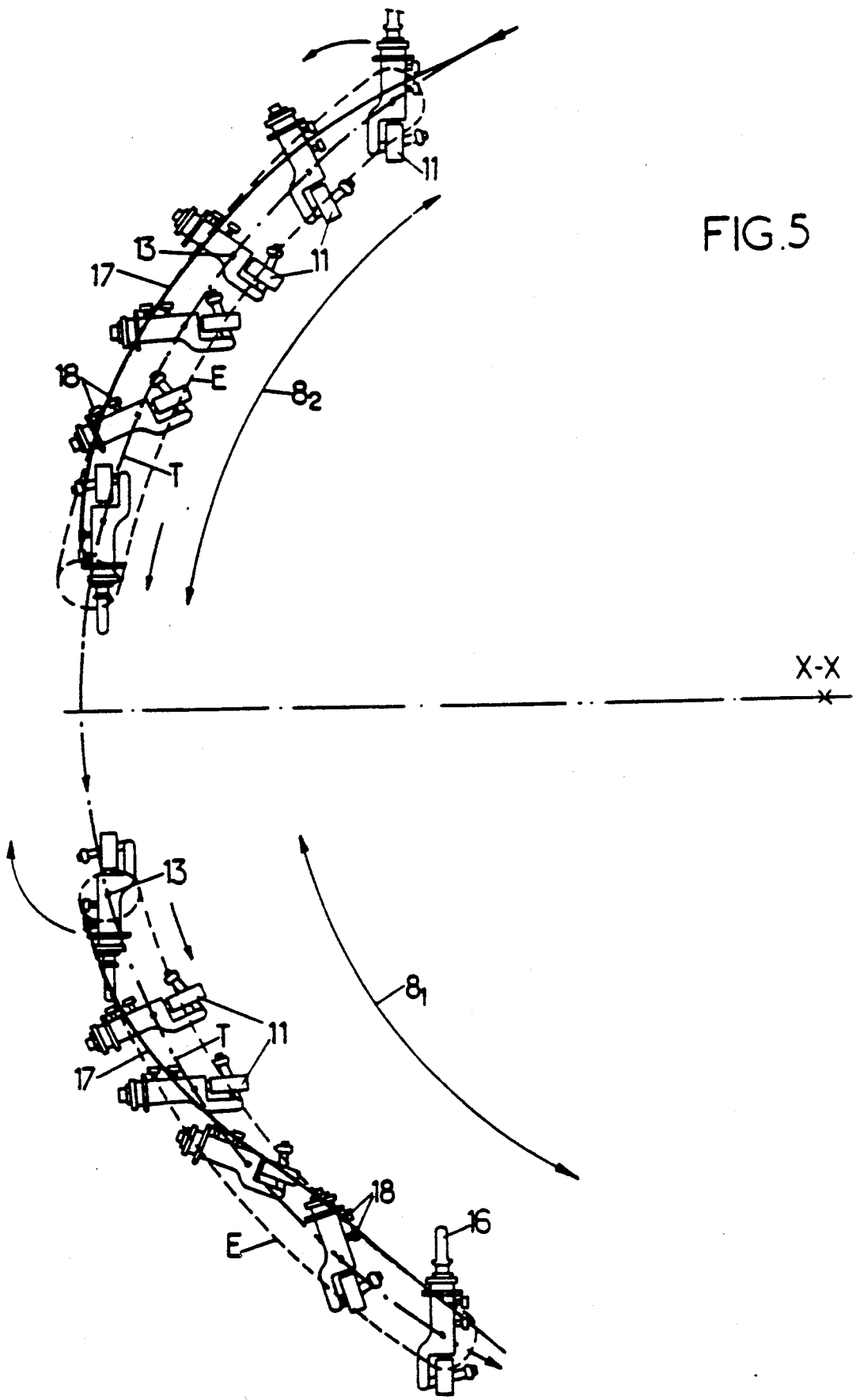
FIG. 5 is a diagrammatic plan view of the equipment configuration illustrated in FIG. 1, showing the arrangements specified in the invention and the method used to introduce improvements.

With reference more specifically to FIGS. 3 to 5, the filiform male cam piece is composed of a metal bar or shaft 17 coiled in a spiral. The shaft 17 extends over approximately one half-turn of the spiral coil so as to cause the supports 11 to pivot by approximately 180°. The pitch of the spiral, i.e., the length of the shaft 17, is selected according to the desired pivoting speed. In the case of a circular path (as shown in FIG. 5 for the equipment installation illustrated in FIG. 1), the shaft is coiled around a toroid E whose axis is the circular path T taken by the swivel pins 13 of the supports during rotation of the plate 2. In the case of a rectilinear path (as in the installation illustrated in FIG. 2), the shaft is coiled around a revolving cylinder whose axis is the linear path taken by the swivel pins 13 of the supports when the conveyor is put in motion. The preparation of the shaft 17 in its final configuration may be easily accomplished by bending a metal shaft around a section of tube having a suitable diameter and which is rectilinear or bent in an arc.

Furthermore, each support 11 is fitted with two lateral fingers which are approximately parallel and equipped with two loose rollers 18, one spaced apart from the other, between which the shaft 17 is inserted and rides during the reversing process. The spacing separating the two rollers 18 is more or less larger than the thickness or diameter of the shaft, to avoid jamming during displacement, especially when the spiral pitch is small. The use of loose rollers makes it possible to provide a rolling contact without slippage and to prevent friction and wear which inevitably result from tracking using stationary fingers.

In FIG. 5, over arc $8_1$, the process of reversal of the preform from the neck-up to the neck-down position occurs upstream from the thermal processing ovens; over arc 8₂, the inverse process of reversal of the preform from the neck-down to the neck up position takes place when exiting the ovens.

Given the mounting structure of the supports 11 on the plate 2 or the endless conveyor 9, and in order to simplify this structure, the two swinging movements should occur in inverse directions on the same semi-circular path, the preform 16 moving to the outside as shown diagrammatically by the double arrow 19 in FIG. 3. This implies that the two guide shafts 17 coil up in inverse directions respectively, as shown in FIG. 5. In this example, upstream from the ovens (reference 8₁) the shaft 17 follows a spiral having a left-hand pitch, while downstream from the ovens (reference 8₂) the winding pitch is right-handed.

Finally, as shown in FIGS. 3 and 4, each arm or clamp 14 is fitted with a stop finger 20 which supports the roller 18 closest to the swivel pin 13 when the support 11 is in the reversed position (FIG. 4). This stop provides a stationary reference point for an approximately vertical positioning of the preform and, therefore, for a predetermined positioning of the preform in relation to the heat source provided by the ovens.

Of course, a large number of variants may be envisioned within the scope of the invention. In particular, the cam piece may, as shown in FIG. 6, be female and composed of a groove 21 extending in a lengthwise, helicoidal contour. This groove, which has a U-shaped cross-section, may be machined in any suitable manner in order to obtain the part 22 in FIG. 6 having the desired helicoidal shape. In the example illustrated in FIG. 6, the groove 21 is wound in a spiral around a rectilinear axis on a cylindrical contour generated by rotation (usable for the installation in FIG. 2). Each support 11 would then possess a protruding finger equipped with a single follower roller (arrangement not illustrated) engaged in the helicoidal groove 21.

As is manifest and as a result of the preceding description, the invention is not limited to those embodiments and modes of application which have been specifically considered; on the contrary, it encompasses all variants. It will be seen, in particular, that the means in accordance with the invention are suited to providing a swinging motion of the supports at any angled amplitude. This angled amplitude is determined solely by the curved length of the cam piece. Furthermore, it will be seen that the type (male or female) of the cam piece is not linked to the type (rotating or linear) of the conveyor, and that either type (male or female) of cam piece may be associated with either type of conveyor (rotating or linear), depending on specific requirements.

We claim:

1. An installation for the manufacture of hollow plastic objects from preforms (16) having one closed and one open end which forms a neck, the installation including:
    at least one conveyor (2, 9) equipped with a plurality of supports (11) for the preforms, a swing-motion control means, said at least one conveyor being a rotating plate conveyor and said supports being displaced along a predetermined path (T), arranged one behind the other, and capable of pivoting (19) within a given angular range when acted upon by said swing-motion control means, so that the preforms may be brought into a final position different from an initial position, wherein said control means comprises:
    a stationary, elongated guide piece (17) forming a male cam, composed of a filiform guide in the shape of a spiral section coiled around the path (T) followed by swivel pins (13) of the preform supports, said spiral section being coiled around a toroid whose axis is the path of the swivel pins of the supports and said spiral section having a length determined according to the pitch of the spiral and the angular amplitude of swing required for the preforms; and
    a plurality of follower means (18) individually attached to each support for cooperating without slippage with the cam such that, during the movement of the supports along the path, the follower means guided by the cam cause each support to swing;
    wherein the follower means comprise at least two protruding fingers attached to each of said supports, said fingers being disposed on opposite sides of the filiform guide at flanking positions; and
    wherein each of said fingers is equipped with a loose roller (18) capable of providing a rolling contact without slippage with the cam.

2. Installation according to claim 1, wherein the cam extends over approximately one half-turn of a helicoidal winding such that each of said preform supports pivots approximately 180° to shift each preform from one of a vertical neck-up and neck-down position to an opposite one of a vertical neck-down and neck-up position, respectively.

3. Installation according to claim 2, further comprising:
    a preform treatment station; and
    first and second control means (8₁ and 8₂) installed upstream and downstream of said station, respectively;
    wherein said preforms are in said neck-down position during passage through said station and wherein said preforms are in said neck-up position upstream and downstream of said station.

4. Installation according to claim 3, wherein each of said first and second control means further comprise a cam having a winding pitch, and wherein said winding pitch of said first control means is inverted with respect to said winding pitch of said second control means.

5. An installation for the manufacture of hollow plastic objects from preforms having one closed and one open end which forms a neck, comprising:
    swing-motion control means for controlling swing of the preforms;
    at last one rotating plate conveyor equipped with a plurality of supports for the preforms, said supports being displaced along a predetermined path and capable of pivoting within a given angular range when acted upon by said swing-motion control means, so that the preforms may be brought into a final position different from an initial position;
    wherein said control means further comprises:
    a stationary, elongated guide piece forming a male cam, composed of filiform guide in the shape of a spiral section coiled around the path followed by swivel pins of the preform supports, said spiral section being coiled around a toroid whose axis is the path of the swivel pins of the supports and said spiral section having a length determined according to the pitch of the spiral and the angular amplitude of swing required for the preforms; and a plurality of follow means, each of said follower means comprising at least two protruding fingers attached to each of said supports, said fingers being disposed on opposite sides of the filiform guide at flanking positions, individually attached to each support for cooperating without slippage with the cam such that, during the movement of the supports along the path, the follower means guided by the cam cause each support to swing;

wherein each of said fingers is equipped with a loose roller for providing a rolling contact without slippage with the cam.

* * * * *